United States Patent
Hertwig et al.

(10) Patent No.: US 7,096,177 B2
(45) Date of Patent: Aug. 22, 2006

(54) MULTIPROCESSOR ARRAY

(75) Inventors: Axel Hertwig, Nürnberg (DE); Rainer Mehling, Nürnberg (DE); Stephan Koch, Zürich (CH)

(73) Assignee: Koninklijke Philips Electronics N.V., Eindhoven (NL)

(*) Notice: Subject to any disclaimer, the term of this patent is extended or adjusted under 35 U.S.C. 154(b) by 835 days.

(21) Appl. No.: 09/965,451

(22) Filed: Sep. 27, 2001

(65) Prior Publication Data

US 2002/0091957 A1    Jul. 11, 2002

(30) Foreign Application Priority Data

Sep. 29, 2000    (DE)    ............... 100 48 732

(51) Int. Cl.
*G06F 13/12*    (2006.01)
(52) U.S. Cl. .............. 703/21; 710/240; 710/241
(58) Field of Classification Search ............ 703/3
See application file for complete search history.

(56) References Cited

U.S. PATENT DOCUMENTS

| | | | | |
|---|---|---|---|---|
| 4,325,147 A | * | 4/1982 | Rothlauf | 370/433 |
| 5,408,627 A | * | 4/1995 | Stirk et al. | 711/151 |
| 5,586,331 A | * | 12/1996 | Levenstein | 710/200 |
| 5,966,229 A | * | 10/1999 | Dodley et al. | 398/120 |
| 6,161,162 A | * | 12/2000 | DeRoo et al. | 710/244 |
| 6,314,499 B1 | * | 11/2001 | Kermani | 711/147 |
| 6,704,819 B1 | * | 3/2004 | Chrysanthakopoulos | 710/240 |

OTHER PUBLICATIONS

Artwick, Bruce A.; "Microcomputer Interfacing", 1980, Prentice-Hall.*
Mano, Morris M.; "Computer System Architecture", 1982, Second Edition, Prentice-Hall.*
Schwartz, Mischa; "Telecommunications Networks: Protocols, Modeling and Analysis", 1987, Addison-Wesley.*
Pride,William M.; Hughes, Robert J.; Kapoor, Jack R.; "Business", 1996, Houghton Mifflini Co.*
Mano, Morris M.; "Computer System Architecture", second edition, 1982, Prentice-Hall Inc.*
Schwartz, Mischa; "Telecommunications Networks: Protocols, Modeling and Analysis", 1987, Addison-Wesley.*

* cited by examiner

*Primary Examiner*—Paul L. Rodriguez
*Assistant Examiner*—Russ Guill

(57) ABSTRACT

A multiprocessor array with a first shadow register unit (3) which operates within a first clock domain, at least one second shadow register unit (11) which operates within a second clock domain, and a peripheral unit (17) which operates within a peripheral clock domain. Within all clock domains there are provided register units (3, 11, 20) which have a construction that is functionally identical.

12 Claims, 1 Drawing Sheet

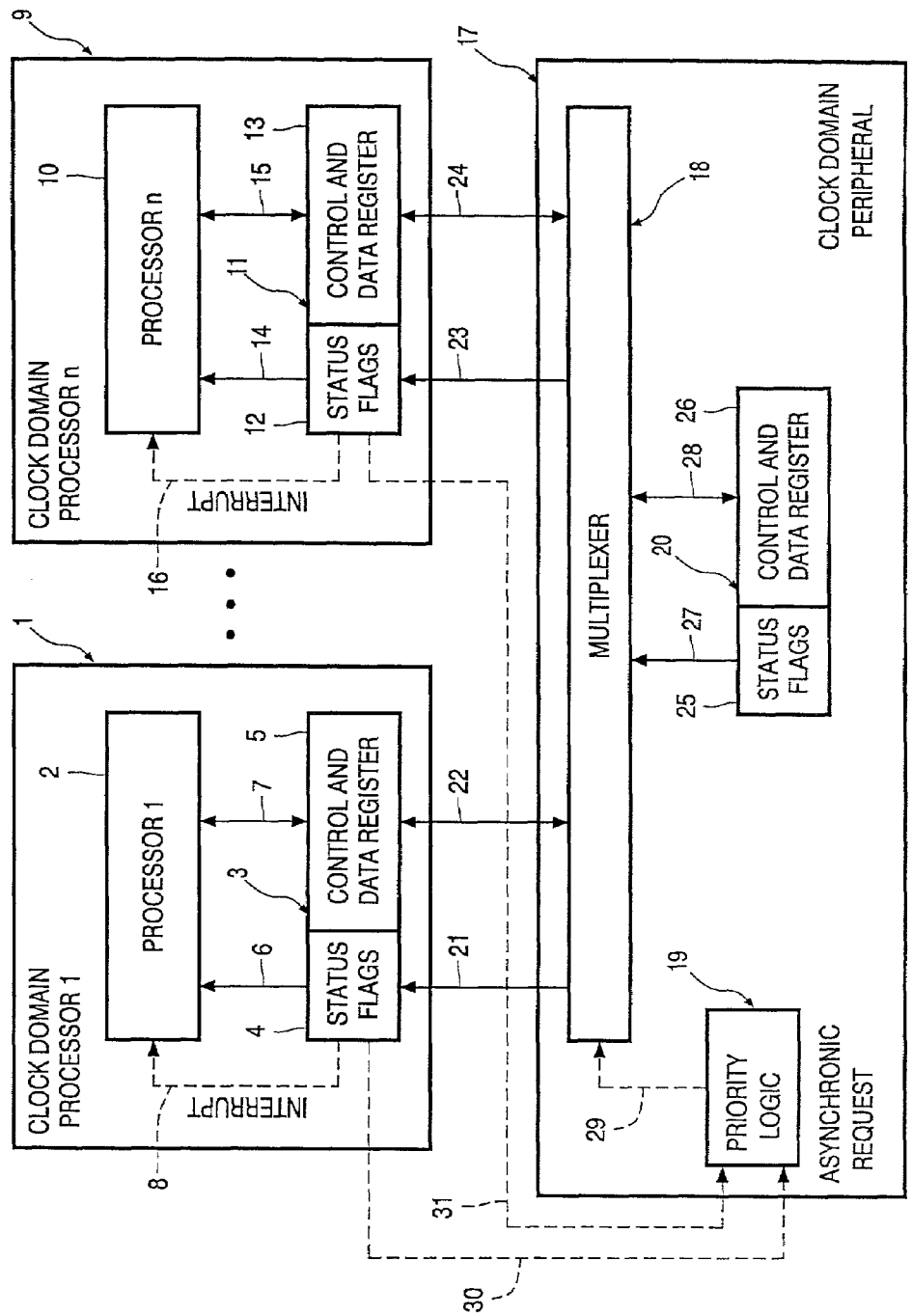

MULTIPROCESSOR ARRAY

The invention relates to a multiprocessor array in which a plurality of processors can asynchronously access a common peripheral unit.

It is known that in cases where a plurality of processors is arranged to access a common peripheral unit the processors are connected thereto via a bus. Accesses on the bus necessitate arbitration between the processors. The implementation of such an arrangement is complex and the operation thereof is not very efficient. Notably the time required for access is no longer deterministic.

Such multiprocessor arrays are used in communication terminals. Several digital signal processors and baseband controller are provided to do different tasks. Such communications terminals are privileged built as portable devices. The efficient use of capacity of existing processors is very important, because each processor has its own power consumption, which is not only depended from the use of capacity of the processor.

It is an object of the invention to provide a multiprocessor array in which a plurality of processors can access a common peripheral unit as simply as possible.

This object is achieved as disclosed in the characterizing part of claim 1. The basic idea of the invention is to provide a shadow register unit within the clock domain of a relevant processor; this shadow register unit is constructed so as to be identical to the register unit of the peripheral unit. Consequently, the transmission of the relevant data from the processor to the peripheral unit can take place without synchronization with another clock domain and also without any arbitration.

Further advantageous embodiments of the invention are disclosed in the dependent claims.

This object is achieved with a communication terminal using a multiprocessor array. By using of capacity of existing processors and peripheral components efficiently, with the same or better performance of the system, a reduction of production cost will be achieved. On the other hand the power consumption is reduced, because of the efficient use of existing components, so no further processor or peripheral components capacity is necessary, so the not needed power for them is saved.

This object is also achieved with portable device. Such multiprocessor arrays are spread used in electronically devices as mobiles, PDAs and MP3 players etc.

Additional features and details of the invention will become apparent from the following description of an embodiment that is given with reference to the drawing. Therein:

FIG. 1 shows diagrammatically a multiprocessor array in accordance with the invention.

A multiprocessor array includes a first processor shadow register unit 1 which operates within a first clock domain, that is, a clock generator domain, and includes a first processor 2 and a first shadow register unit 3. The shadow register unit 3 itself consists of status flags 4 as well as control/data registers 5 which are connected to the processor 2 via data transmission lines 6 and 7. The status flags 4 are capable of initiating an interrupt 8 in the processor 2.

There is also provided a second processor shadow register unit 9 which operates within a second clock domain, has a construction that is analogous to that of the first processor shadow register unit 1, and includes a processor 10, a second shadow register unit 11 with status flags 12 and control/data registers 13 with data transmission lines 14 and 15. The status flags 12 are connected to the processor 10 via an interrupt 16. A series of further processor shadow register units of analogous construction may be provided. It is also possible to provide a plurality of processors and associated processor shadow register units in the same clock domain. Evidently, the multiprocessor array can also be provided with a single processor shadow register unit only.

The multiprocessor array also includes a peripheral unit 17 which operates within a peripheral clock domain and includes a multiplexer unit 18, a priority unit 19 as well as a register unit 20. The peripheral unit 17 may be an infrared interface, a UART (Universal Asynchronous Receiver Transmitter) interface or a USB (Universal Serial Bus) interface. The multiplexer unit 18 is connected, via data transmission lines 21 and 22, to the status flags 4 and the control/data registers 5, respectively. Furthermore, the multiplexer unit 18 is connected to the status flags 12 and to the control/data registers 13 via data transmission lines 23 and 24. In as far as further processor shadow register units are provided, the multiplexer unit 18 is also connected to the corresponding shadow registers by way of further data transmission lines. The register unit 20 includes status flags 25 as well as control/data registers 26 which are connected to the multiplexer unit 18 via data transmission lines 27 and 28, respectively. The shadow register units 3 and 11 and any further shadow register units have a construction which is identical to that of the register unit 20. The construction is identical at least functionally. The priority unit 19 is connected, via a data transmission line 29, to the multiplexer unit 18 and applies appropriate control signals thereto. The status flags 4 and 12 are connected to the priority unit 19 via request lines 30 and 31, respectively.

The operation of the multiprocessor array will be described in detail hereinafter. When the processor 2 wishes to use the peripheral unit 17 and write in the register unit 20 for this purpose, it first writes in the identical shadow register 3 that is present in its clock domain. No synchronization problems occur during the writing in the shadow register 3, because the shadow register 3 is situated in the same clock domain as the first processor 2. Furthermore, there will be no conflicts with the other processors. The writing in the shadow register 3 terminates the communication with the periphery for the processor 2. The processor is notified about possible results or the termination of the task to be transferred to the peripheral unit 17 via an interrupt 8.

Simultaneously with the processor 2 further processors, for example, the processor 10, can apply similar requests to their associated shadow register unit 11. The processors 2 and 10 can thus operate independently from one another and asynchronously with respect to one another. The access to the shadow register units 3 and 11 is controlled completely by the associated processors 2 and 10, respectively.

When changes have been made in the shadow register unit 3, the priority unit 19 is informed accordingly via the asynchronous request line 30. The priority unit 19 decides, on the basis of priority criteria to be described in detail hereinafter, which request is to be dealt with first. When the processor 2 is granted priority, the priority unit 19 controls, via the line 29, the multiplexer unit 18 in such a manner that the contents of the shadow register 3 are read out by the multiplexer unit 18 via the lines 21 and 22. Because static data in the shadow register unit 3 is read out during the reading operation, it is not important that the first clock domain of the processor shadow register unit 1 and the peripheral clock domain are not tuned to one another. The transmission of the data may thus take place asynchronously. The data read out from the shadow register unit 3 is copied in the register unit 20. The peripheral unit 17 then executes its assigned task. In this case, for example, data is output to the environment via an infrared interface. In the mean time the priority unit 19 does not handle any further requests. When the peripheral unit 17 has completed its task, corresponding data results and status information is returned to the corresponding shadow register unit 3. The peripheral unit 17 is then in the idle state again and the priority unit 19 can select the next request. As soon as the data results and status information from the peripheral unit 17 have been copied in the shadow register unit 3, an interrupt can be initiated so as to inform the processor 2 about the completion of its request.

The request signals transmitted via the request lines 30 and 31 are encoded as one-bit signals. This offers the advantage that synchronization of the various clock domains is not necessary for the transmission of a request signal from the shadow register unit 3 or 11 to the priority unit 19. Therefore, the request signal can be transmitted asynchronously.

The priority unit 19 has various possibilities for allocating priorities to the various processors 2 and 10. On the one hand, the underlying principle may be: first-come, first-served. The request from the processor that comes next is then processed next. Furthermore, the processors can also be served in their correct order, that is, the processor 2 is succeeded by the processor 10 and all other processors connected to the peripheral unit 17. Moreover, there is a possibility for allocating different priorities to the processors. In that case, for example, the processor 2 would always be privileged over the processor 10. The priorities may also be statistically distributed. For example, 60% of the time could be allocated to the processor 2 and 40% of the time to the processor 10. Moreover, a new allocation may take place either before each access or only after an explicit release of an allocation. In the latter case block processing would be possible. As an alternative for an interrupt after the completion of the task it is also possible to test the status by way of the relevant processor at regular intervals; this is also referred to as polling.

The multiprocessor array offers the advantage that a processor can always access a common peripheral unit without conflicting with other processors. A time-consuming bus arbitration can thus be avoided and the efficiency of the peripheral unit maximized. The clock supply for the individual processors and the peripheral unit may remain separate.

The invention claimed is:

1. A multiprocessor array which includes: a) a first processor shadow register unit (1) which operates within a first clock domain and includes i) a first processor (2), and ii) a first shadow register unit (3) which is connected to the first processor (2) so as to transmit data bidirectionally, b) at least one second processor shadow register unit (9) which i) operates within a corresponding second clock domain, ii) includes a second processor (10), and iii) a second shadow register unit (11) which is connected to the second processor (10) so as to transmit data bidirectionally, and c) a peripheral unit (17) which operates within a peripheral clock domain and includes i) a multiplexer unit (18) which is connected to the first shadow register unit (3) and the at least one second shadow register unit (11) so as to transmit data bidirectionally, ii) a register unit (20) having the construction and identical function of the first shadow register unit (3) and the at least one second shadow register unit (11), and iii) a priority unit (19) directly connected to a multiplexer unit (18) via only a single action connection for applying control signals thereto and for allocating the multiplexer unit (18) for data transmission to the first shadow register unit (3) or to the at least one second shadow register unit (11) based on at least one criterion, the priority unit (19) being connected to the first shadow register unit (3) and to the at least one second shadow register unit (11), via a corresponding asynchronous request line, said request line informing the priority unit of changes in a corresponding shadow register.

2. A multiprocessor array as claimed in claim 1, characterized in that the first shadow register unit (3), the at least one second shadow register unit (11) and the register unit (20) include status flags as well as control/data registers.

3. A multiprocessor array as claimed in claim 1, characterized in that the first clock domain and/or the at least one second clock domain include more than one processor.

4. A multiprocessor array as claimed in claim 1, characterized in that in order to read out data from the first shadow register unit (3) and/or the at least one second shadow register unit (11) the multiplexer unit (18) is connected thereto in the read out direction.

5. A multiprocessor array as claimed in claim 1, characterized in that requests for access from the first shadow register unit (3) and/or the at least one second shadow register unit (11) to the priority unit (19) are encoded as a one-bit signal.

6. A multiprocessor array as claimed in claim 1, wherein said at least one criterion is in conformity with the principle: first-come, first-served.

7. A multiprocessor array as claimed in claim 1, wherein said at least one criterion is in conformity with the principle: all shadow register units (3, 11) are served successively.

8. A multiprocessor array as claimed in claim 1, wherein said at least one criterion is in conformity with the principle: each shadow register unit is statistically allocated a given percentage of the time for accessing the peripheral unit (17).

9. A multiprocessor array as claimed in claim 1, characterized in that the peripheral unit (17) is constructed as an infrared interface, UART interface or USB interface.

10. A multiprocessor array as claimed in claim 1, characterized in that the first shadow register unit (3) and/or the at least one second shadow register unit (11) are connected to the associated processor (2, 10) via an interrupt (8, 16) initiated by respective status flags of said first and second shadow register units.

11. A communication terminal using a multiprocessor array comprising: a) a first processor shadow register unit (1) which operates within a first clock domain and includes i) a first processor (2), and ii) a first shadow register unit (3) which is connected to the first processor (2) so as to transmit data bidirectionally, b) at least one second processor shadow register unit (9) which i) operates within a corresponding second clock domain, ii) includes a second processor (10), and iii) a second shadow register unit (11) which is connected to the second processor (10) so as to transmit data bidirectionally, and c) a peripheral unit (17) which operates within a peripheral clock domain and includes i) a multiplexer unit (18) which is connected to the first shadow register unit (3) and the at least one second shadow register unit (11) so as to transmit data bidirectionally, ii) a register unit (20) having the construction and identical function of the first shadow register unit (3) and the at least one second shadow register unit (11), and iii) a priority unit (19) directly connected to a multiplexer unit (18) via only a single active connection for applying control signals thereto and for allocating the multiplexer unit (18) for data transmission to the first shadow register unit (3) or to the at least one second shadow register unit (11) based on at least one criterion, the priority unit (19) being connected to the first shadow register unit (3) and to the at least one second shadow register unit (11), via a corresponding asynchronous request line, said request line informing the priority unit of changes in a corresponding shadow register.

12. A portable device using a multiprocessor array comprising: a) a first processor shadow register unit (1) which operates within a first clock domain and includes i) a first processor (2), and ii) a first shadow register unit (3) which is connected to the first processor (2) so as to transmit data bidirectionally, b) at least one second processor shadow register unit (9) which i) operates within a corresponding second clock domain, ii) includes a second processor (10), and iii) a second shadow register unit (11) which is connected to the second processor (10) so as to transmit data bidirectionally, and c) a peripheral unit (17) which operates within a peripheral clock domain and includes i) a multiplexer unit (18) which is connected to the first shadow register unit (3) and the at least one second shadow register unit (11) so as to transmit data bidirectionally, ii) a register unit (20) having the construction and identical function of the first shadow register unit (3) and the at least one second shadow register unit (11), and iii) a priority unit (19) directly connected to a multiplexer unit (18) via only a single active connection for applying control signals thereto and for allocating the multiplexer unit (18) for data transmission to the first shadow register unit (3) or to the at least one second shadow register unit (11) based on at least one criterion, the priority unit (19) being connected to the first shadow register unit (3) and to the at least one second shadow register unit (11), via a corresponding asynchronous request line, said request line informing the priority unit of changes in a corresponding shadow register.

\* \* \* \* \*